United States Patent
Kobayashi et al.

(10) Patent No.: US 7,128,469 B2
(45) Date of Patent: Oct. 31, 2006

(54) LIGHTWEIGHT BEARING AND WAVE GEAR DRIVE

(75) Inventors: Masaru Kobayashi, Nagano-ken (JP); Rolf Slatter, Lahn (DE)

(73) Assignees: Harmonic Drive Systems Inc., Tokyo (JP); Harmonic Drive Aktiengesellschaft, Lahn (DE)

( * ) Notice: Subject to any disclaimer, the term of this patent is extended or adjusted under 35 U.S.C. 154(b) by 498 days.

(21) Appl. No.: 10/751,727

(22) Filed: Dec. 30, 2003

(65) Prior Publication Data

US 2004/0184691 A1 Sep. 23, 2004

Related U.S. Application Data

(63) Continuation of application No. 10/150,962, filed on May 21, 2002, now Pat. No. 6,682,220.

(30) Foreign Application Priority Data

May 22, 2001 (JP) .............................. 2001-151833

(51) Int. Cl.
F16C 19/16 (2006.01)

(52) U.S. Cl. ....................................... 384/447; 384/912

(58) Field of Classification Search ................ 384/447, 384/537, 912, 492, 625, 907.1, 909
See application file for complete search history.

(56) References Cited

U.S. PATENT DOCUMENTS 6,575,631 B1 * 6/2003 Shoda et al. ................. 384/447

FOREIGN PATENT DOCUMENTS

| JP | 09-250608 | 9/1997 |
| JP | 09-303496 | 11/1997 |

* cited by examiner

*Primary Examiner*—Lenard A. Footland
(74) *Attorney, Agent, or Firm*—Darby & Darby

(57) ABSTRACT

A lightweight bearing and wave gear drive are provided. An outer or inner bearing ring of the bearing has fixing holes to enable the ring to be attached to another member. The parts of the bearing on which raceway surfaces are formed are made of an iron-based material, while the main bearing ring member is formed of a lightweight material that is lighter than the iron-based material. Surface portions that constitute fixing bolt seats are plated to increase the strength of such portions. The wave gear drive includes a rigid internal gear, a flexible external gear located inside the internal gear, and a wave generator located inside the external gear. The internal and external gears are coupled by the lightweight bearing in a way that allows the gears to rotate relative to each other.

8 Claims, 2 Drawing Sheets

LIGHTWEIGHT BEARING AND WAVE GEAR DRIVE

CROSS-REFERENCE TO RELATED APPLICATION

This application is a continuation application of U.S. patent application Ser. No. 10/150,962, filed May 21, 2002, and which is hereby incorporated by reference in its entirety, and claims priority under 35 U.S.C. § 119 from Japanese Patent Application No. 2001-151833, filed on May 22, 2001.

BACKGROUND OF THE INVENTION

1. Field of the Invention

The present invention relates to a lightweight bearing, and to a wave gear drive in which a rigid, circular internal gear and a flexible, circular external gear are coupled by the lightweight bearing so that the gears can rotate relative to each other.

2. Description of the Related Art

In JP-A 09-250608, this applicant proposed a compact wave gear drive unit that uses a cross-roller bearing. The compact wave gear drive unit of this disclosure included first and second end-plates disposed at each end in the unit's axial direction, a top-hat-shaped wave gear drive incorporated between the end-plates, and a cross-roller bearing that rotatably supports a top-hat-shaped flexible external gear and rigid internal gear constituting the wave gear drive, a drive housing being comprised by an outer ring of the cross-roller bearing and the first and second end-plates. In JP-A 09-303496, this applicant also proposed a wave gear drive unit having a similar structure, that included a cup-shaped wave gear drive.

Such wave gear drive units are compact enough to be used as reduction gear mechanisms of actuators incorporated in robotic arms and other such applications in which installation space is limited. Generally, it is necessary for the constituent components of such mechanisms to be light in weight. In a wave gear drive unit, the cross-roller bearing and rigid internal gear in particular are heavy, so if the weight of these parts could be reduced, it would make it possible to reduce the weight of the wave gear drive unit.

However, the raceway surfaces of the cross-roller bearing and the teeth of the rigid internal gear have to be durable and wear-resistant, which has necessitated the use of heavy iron-based materials. Moreover, the bearing rings of the cross-roller bearing and rigid internal gear are affixed to other members such as the unit housing, so if such members are made of a lightweight material such as aluminum alloy, the members are not able to withstand the seating pressure of the fixing bolts, leading to seating faces that are defective or strained and the like, thereby degrading the fixing force. For these reasons, it has been difficult to reduce the weight of cross-roller bearings and wave gear drive units.

A main object of the present invention is to provide a lightweight cross-roller bearing and wave gear drive in which the light weight is achieved without harming the performance of the bearing raceway surfaces or rigid internal gear teeth while at the same time ensuring the seating-face strength of the fastening surfaces of the bearing rings and rigid internal gear of the wave gear drive.

SUMMARY OF THE INVENTION

To attain the above object, the present invention provides a lightweight bearing in which at least an outer or inner bearing ring has fixing holes formed therein for fixing the ring to another member, the bearing ring comprising a main bearing ring member in which said fixing holes are formed, and a raceway surface formation member that is fixed to the main bearing ring member and forms a raceway surface on an inner peripheral surface or outer peripheral surface, the raceway surface formation member is formed of an iron-based material, the main bearing ring member is formed of a lightweight material that is lighter than the iron-based material, and a hard plated coating is formed on surface portions of the main bearing ring member that form a seat for fasteners used in the fixing holes.

The coating can be an electroplated or electroless coating of nickel or chromium, and the coating can be approximately 5 microns thick. The lightweight material can be an alloy of a light metal such as aluminum alloy or titanium alloy, or can be plastic, or ceramics.

When said ring is the outer bearing ring, the main bearing ring member can be formed of aluminum alloy, and the raceway surface formation member comprised of an iron-based material can be cast in the aluminum alloy or inserted into the main bearing ring member, using pressing by shrink-fitting or the like to unite the two members. The main bearing ring member can instead be formed of titanium alloy and forging used to unite the raceway surface formation member formed of iron-based material with the main bearing ring member.

When said ring is the inner bearing ring, the main bearing ring member can be formed of titanium alloy, and the raceway surface formation member comprised of an iron-based material can be cast in the titanium alloy or inserted into the main bearing ring member, using pressing by shrink-fitting or the like to unite the two members. The main bearing ring member can instead be formed of aluminum alloy and forging used to unite the raceway surface formation member formed of iron-based material with the main bearing ring member.

The above and other objects can also be attained by a wave gear drive comprising a rigid internal gear, a flexible external gear located inside the internal gear, a wave generator located therein, and a lightweight bearing having the above-described configuration that couples the rigid internal gear and flexible external gear in a state in which there can be relative rotation between the internal gear and the external gear.

The rigid internal gear comprises a main gear member, and a circular teeth formation member that is attached to an inner peripheral surface of the main gear member and has internal teeth formed on an inner peripheral surface. The teeth formation member is formed of an iron-based material and the main gear member can be formed of a lightweight material that is lighter than the iron-based material.

The wave generator comprises a rigid cam plate and a ball bearing that fits on an outer peripheral surface of the rigid cam plate. The rigid cam plate can be formed of a lightweight material that is lighter than the iron-based material.

When the main gear member of the rigid internal gear has fixing holes formed therein for attachment to another member, it is desirable to form a hard plated coating of a surface portion that seats fasteners used in the fixing holes. The hard plated coating can be an electroplated or electroless coating of nickel or chromium approximately 5 microns thick. It is preferable for the seat to have a limit contact pressure that is at least about 25 kgf/mm². The lightweight material can be an alloy of a light metal such as aluminum alloy or titanium alloy, or can be plastic or a ceramics material.

In the wave gear drive of the invention thus comprising a rigid internal gear, a flexible external gear located inside the internal gear, a wave generator located therein, and a lightweight bearing configured to couple the rigid internal gear and flexible external gear in a state in which there can be relative rotation between the internal and external gears, the rigid internal gear comprises a main gear member, and a circular teeth formation member that is attached to an inner peripheral surface of the main gear member and has internal teeth formed on an inner peripheral surface, with the teeth formation member being formed of an iron-based material and the main gear member formed of a lightweight material that is lighter than the iron-based material. The main gear member of the rigid internal gear has fixing holes formed therein for attachment to another member, and a surface portion that forms seats of fasteners used in the fixing holes has a hard-plate coating. The hard plated coating can be an electroplated or electroless coating of nickel or chromium approximately 5 microns thick. The fastener seats have a limit contact pressure that is at least about 25 $kgf/mm^2$. The lightweight material can be an alloy of a light metal such as aluminum alloy or titanium alloy, or can be plastic or a ceramics material.

Further features of the invention, its nature and various advantages will be more apparent from the accompanying drawings and following detailed description of the invention.

DESCRIPTION OF THE PREFERRED EMBODIMENT

Figure 1:
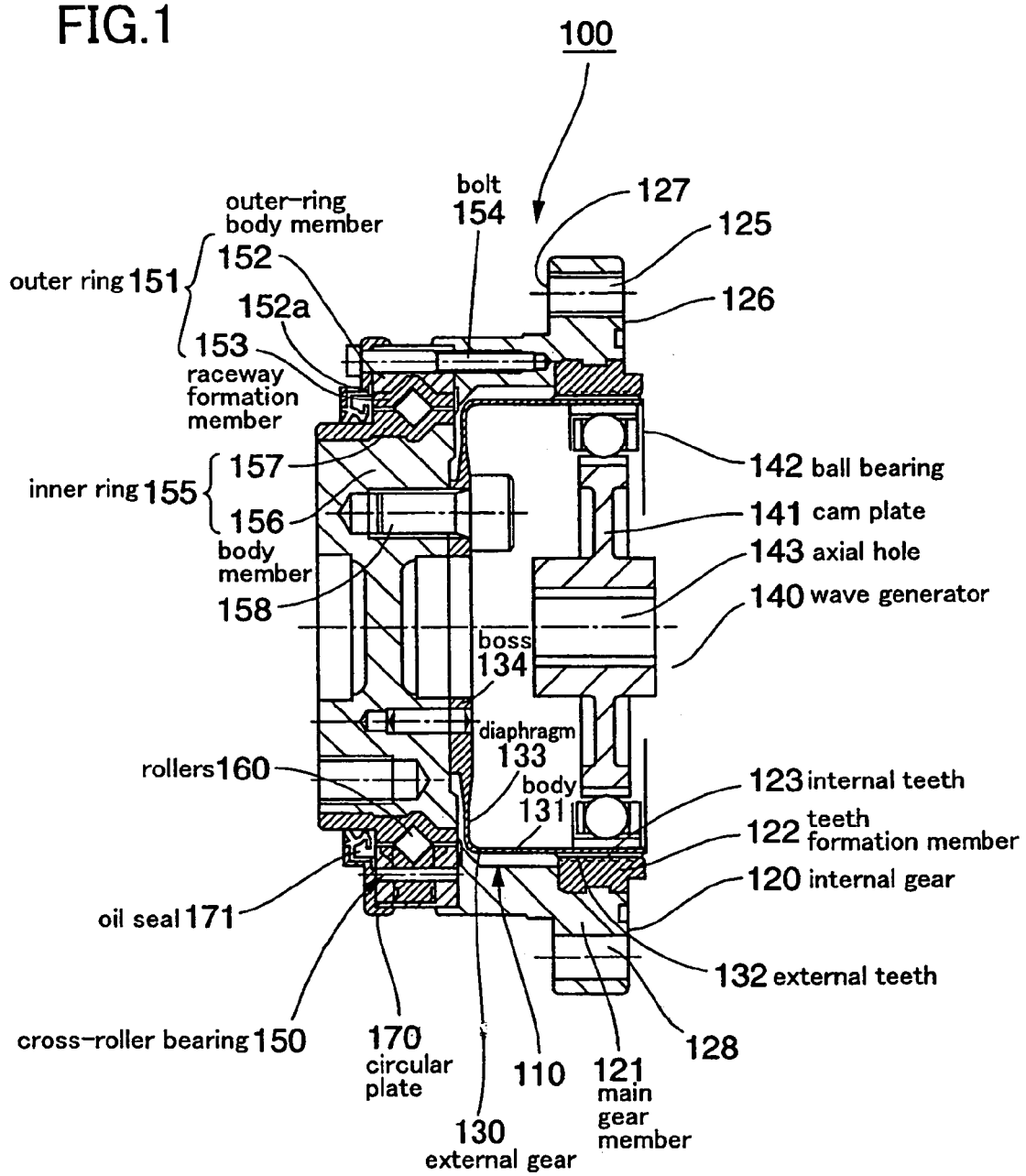
FIG. 1 is a cross-sectional diagram of a cup-shaped wave gear drive unit according to the present invention.
Figure 2:
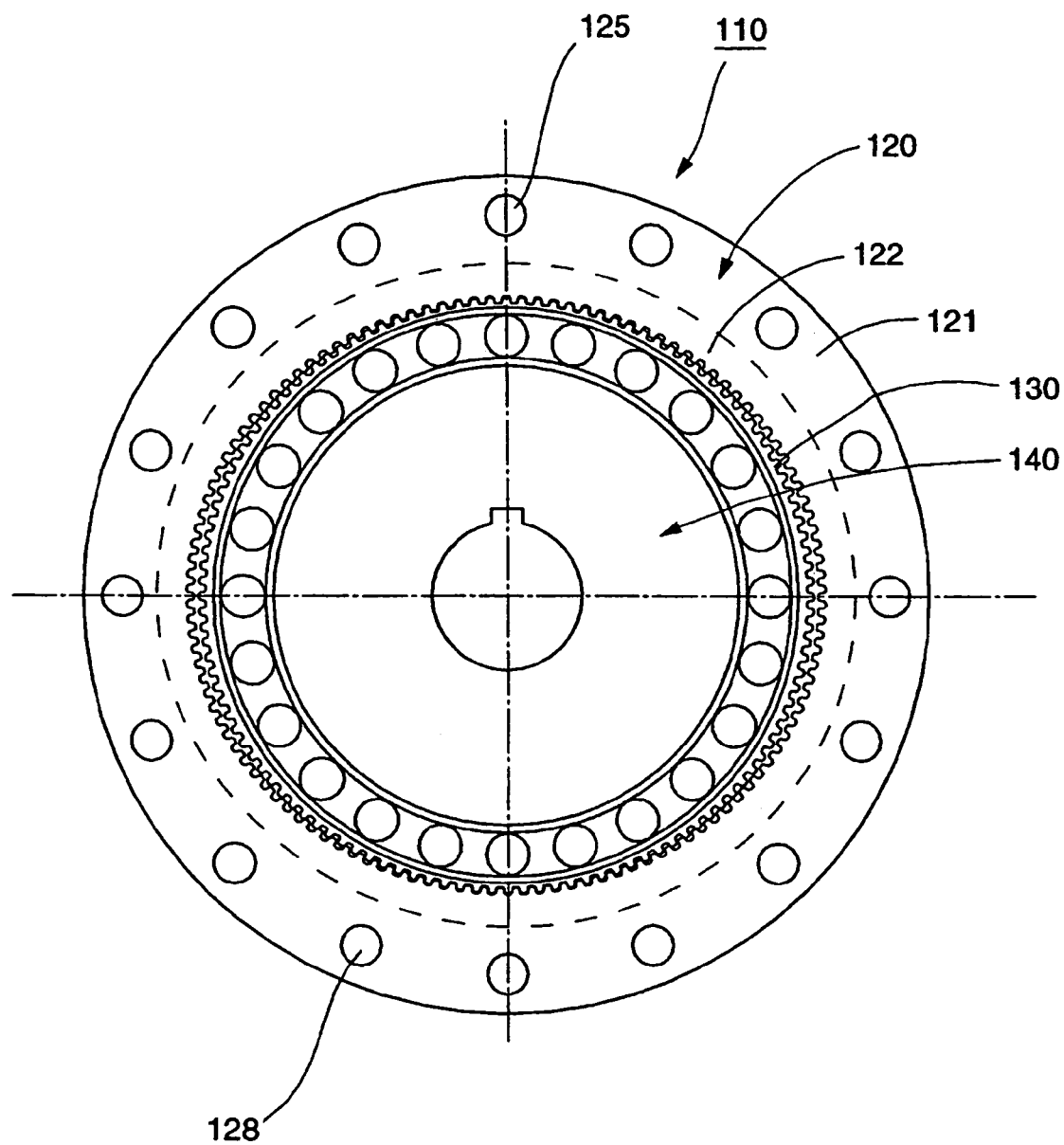
FIG. 2 is a diagram for explaining the cup-shaped wave gear drive unit of FIG. 1.

A wave gear drive unit that applies the present invention will now be described, with reference to FIG. 1, which is a cross-sectional diagram of a cup-shaped wave gear drive unit according to the present invention, and FIG. 2, which shows the configuration of the wave gear drive. The wave gear drive 110 of the wave gear drive unit 100 includes a circular, rigid internal gear 120 having internal teeth 123 provided on its inner peripheral surface, a cup-shaped, flexible external gear 130 disposed inside the rigid internal gear 120, and an elliptical wave generator 140 disposed inside the flexible external gear 130. The flexible external gear 130 and rigid internal gear 120 are rotatably supported by a cross-roller bearing 150 in a way that enables the gears 130 and 120 to rotate relative to each other. The rigid internal gear 120 is a composite part consisting of a cylindrical main gear member 121 and a teeth formation member 122 integrally affixed to an inside peripheral edge of the main gear member 121. Internal teeth 123 are provided on an inner peripheral surface of the teeth formation member 122.

The cup-shaped flexible external gear 130 includes a cylindrical body 131, external teeth 132 formed on an outer periphery around an opening at one end of the body 131, a circular diaphragm 133 formed integrally at an opening at the other end of the body 131, and a thick, annular boss 134 formed integrally with the diaphragm 133. The wave generator 140 comprises a rigid, elliptical cam plate 141 and a ball bearing 142 mounted on an outer periphery of the rigid cam plate 141. The rigid cam plate 141 has an axial hole 143 for coupling to a motor output shaft (not shown).

The cross-roller bearing 150 includes an outer ring 151, an inner ring 155, and a plurality of rollers 160 disposed in a circular raceway provided between the outer and inner rings 151 and 155. The outer ring 151 is a composite part consisting of an annular outer-ring body member 152 and an annular outer-ring raceway formation member 153 on an inside of the member 152. An inner peripheral surface of the outer-ring raceway formation member 153 is formed as a V-shaped raceway surface. The outer ring 151 thus configured is attached to a circular end face of the rigid internal gear 120 by bolts 154.

The inner ring 155 is a composite part consisting of a thick, annular inner-ring body member 156 and an annular inner-ring raceway formation member 157 on an outside of the member 156. An outer peripheral surface of the inner-ring raceway formation member 157 is formed as a V-shaped raceway surface. The inner ring 155 thus configured is attached to the boss 134 by bolts 158. An outer end of the inner-ring body member 156 is coupled to a drive-side member (not shown). A circular plate 170 is provided on a circular end face 152a to form a seat for the bolts. An oil seal 171 is provided around an inner peripheral edge of the plate 170; the seal 171 acts as a seal between the inner and outer rings 155 and 151.

When the wave generator 140 is rotated by a motor, it flexes the internal gear 120 into an elliptical shape, pushing the ends of the ellipse into engagement with the external gear 130 and moving the mesh points around the circumference, generating a relative rotation between the gears arising from the difference in the number of gear teeth. An input rotational speed is thus greatly reduced. In this example, the rigid internal gear 120 is fixed, and the reduced rotation is output from the side of the inner-ring body member 156 fixed to the flexible external gear 130.

Thus, the bearing outer ring 151 is a composite part consisting of the outer-ring body member 152 and the outer-ring raceway formation member 153. Similarly, the inner ring 155 is a composite part consisting of the inner-ring body member 156 and the inner-ring raceway formation member 157. And, the rigid internal gear 120 is a composite part consisting of the main gear member 121 and the teeth formation member 122. The outer-ring body member 152, inner-ring body member 156, and teeth formation member 122 are all formed of a lightweight material that is lighter than iron-based material. Examples of materials that can be used include alloys of a light metal such as aluminum alloy and titanium alloy, plastic, and ceramics. On the other hand, the outer-ring raceway formation member 153 and inner-ring raceway formation member 157 which have raceway surfaces, and the teeth formation member 122 on which the internal teeth 123 are formed, are all formed of an ordinary iron-based material. In this example, the rigid cam plate 141 of the wave generator 140 also is formed of an alloy of a light metal such as aluminum alloy and titanium alloy, or of plastic or ceramics.

The method of manufacturing the composite inner and outer rings 151 and 155 will now be described. First, the outer-ring body member 152 and the outer-ring raceway formation member 153 are attached together as follows.

When the outer-ring body member 152 is formed of aluminum alloy, which has a larger coefficient of linear expansion than an iron-based material, aluminum alloy casting is used to unite the outer-ring raceway formation member 153, which is made of iron-based material, with the outer-ring body member 152. The two members can also be united by pressing using shrink-fitting or the like the outer-ring raceway formation member 153 into the outer-ring body member 152. After using casting to unite the members, the inner peripheral (raceway) surface of the outer-ring raceway formation member 153 can be hardened using high-frequency or laser hardening, which can be followed by machining.

When the outer-ring body member 152 is formed of titanium alloy, which has a smaller coefficient of linear expansion than an iron-based material, forging can be used to unite the outer-ring body member 152 with the outer-ring raceway formation member 153 formed of iron-based material. When forging is used, contact surfaces of the two members can be coated with adhesive. Heat-treatment can be used to harden the inner peripheral (raceway) surface of the outer-ring raceway formation member 153 beforehand, or high-frequency or laser hardening can be used after the members have been united.

When the difference in the coefficients of linear expansion of the outer-ring body member 152 and the outer-ring raceway formation member 153 is less than $5 \times 10^{-6}$, the members can be united using casting, forging, shrink-fitting, or epoxy resin or other such adhesive.

Next, the method of uniting the component parts of the inner ring 155 will be described. When the inner-ring body member 156 is formed of titanium alloy, the inner-ring raceway formation member 157 and inner-ring body member 156 can be united by casting the iron-based inner-ring raceway formation member 157 in the titanium alloy, or by pressing using shrink-fitting or the like the inner-ring raceway formation member 157 into the inner-ring body member 156. After the casting, the inner peripheral (raceway) surface of the inner-ring raceway formation member 157 can be hardened by high-frequency or laser hardening, which can be followed by machining.

When the inner-ring body member 156 is formed of aluminum alloy, forging can be used to unite it with the inner-ring raceway formation member 157 made of iron-based material. The members can also be united by pressing using shrink-fitting or the like. When forging or press-fitting is used, adhesive can be applied to contact surfaces of both members. Heat-treatment can be used beforehand to harden the inner peripheral (raceway) surface of the inner-ring raceway formation member 157, or high-frequency or laser hardening can be used after the members have been united. When the difference in the coefficients of linear expansion of the inner-ring body member 156 and the inner-ring raceway formation member 157 is less than $5 \times 10^{-6}$, the members can be united using casting, forging, shrink-fitting, or epoxy resin or other such adhesive. Following on from this, the members 121 and 122 of the rigid internal gear 120 can be united in the same way as in the case of the outer ring described above.

To increase the strength of the union of the composite parts of the inner and outer rings 155 and 151, it is desirable to form axial and/or circumferential ridges to prevent the parts from disengaging. It is also desirable for the thickness of the portions of the members 153 and 157 on which raceways are formed to be at least one-fifth of the diameter of the rollers of the cross-roller bearing 150.

Bolts 154 are used to attach the outer-ring body member 152 to the main gear member 121. If the bolts 154 are seated on the circular end face 152a of the outer-ring body member 152, which is made of lightweight material, in some cases a light metal alloy might not be strong enough when a high bolt seating pressure is used. In such a case, as described above, the iron-based-material circular plate 170 is disposed on the circular end face 152a of the outer-ring body member 152, so that the surface of the plate 170 provides the seating for the bolts. Also, an inside edge of the plate 170 is configured to form an oil seal 171. Therefore, attaching the plate 170 also forms an oil seal, eliminating the task of attaching an oil seal and also rendering unnecessary a mechanism for affixing an oil seal.

Instead of using the plate 170, the specified limit contact pressure of the end face 152a constituting the bolt seat can be increased by forming a nickel or chromium plate coating about 5 microns thick on the surface of the end face 152a. A bolt seat contact pressure is usually from 25 kgf/mm$^2$ to 37 kgf/mm$^2$, so it is only necessary to use the surface plating to increase the limit contact pressure of the end face 152a to at least that level. Similarly, fixing bolt holes 125 and tapped holes 128 are provided in the main gear member 121 for attachment purposes, and the limit contact pressure of circular end faces 126 and 127 in which the bolt holes 125 are formed may not be enough when the main gear member 121 is formed of a material such as aluminum alloy. In this case too, surfaces of the end faces 126 and 127 can be plated to increase the limit contact pressure to an adequate level.

While in the foregoing the present invention has been described with reference to a cup-shaped wave gear drive, the invention is also applicable to wave gear drives having other configurations. The invention can also be applied to simplex cross-roller bearings and to other bearings.

As described in the foregoing, in the lightweight bearing according to the present invention, the outer-ring and inner-ring body members are formed of lightweight materials, and just the outer-ring and inner-ring raceway formation members, which need to have high strength, are formed of iron-based material, and these members are joined together. Bolt seating surfaces are plated to ensure they are sufficiently strong to withstand bolt contact pressures. Therefore, in accordance with this invention, it is possible to attain a bearing that is very light and can be securely fastened to other members.

The invention also provides a wave gear drive in which, in the rigid internal gear, lightweight material is used for the main gear member and iron-based material for the teeth formation member, and the bolt seating surface portions of the main gear member are plated to ensure sufficient contact strength. Thus, in accordance with this invention, it is possible to realize a lightweight wave gear drive that can be securely fastened to other members.

What is claimed is:

1. A bearing in which at least an outer or inner bearing ring has fixing holes formed therein for fixing the ring to another member, the bearing ring comprising:
    a main bearing ring member in which said fixing holes are formed, and a raceway surface formation member that is fixed to the main bearing ring member and forms a raceway surface on an inner peripheral surface or outer peripheral surface;
    the raceway surface formation member is formed of an iron-based material, the main bearing ring member is formed of a material that is lighter than the iron-based material; and
    a plated coating is formed on surface portions of the main bearing ring member that form a seat for fasteners used in the fixing holes.

2. A bearing according to claim 1, wherein the plated coating is an electroplated or electroless coating of nickel or chromium.

3. A bearing according to claim 2, wherein the plated coating is approximately 5 microns thick.

4. A bearing according to claim 1, wherein the lighter material is an aluminum alloy or titanium alloy, or plastic, or ceramics.

5. A bearing according to claim 1, in which the bearing ring is an outer ring;
   the main bearing ring member is formed of aluminum alloy; and
   the raceway surface formation member comprised of an iron-based material is cast in the aluminum alloy and inserted into the main bearing ring member using pressing by shrink-fitting to unite the two members.

6. A bearing according to claim 1, in which the bearing ring is an inner ring;
   the main bearing ring member is formed of titanium alloy; and
   forging is used to unite the raceway surface formation member formed of iron-based material with the main bearing ring member.

7. A bearing according to claim 1, wherein the bearing ring is an inner ring;
   the main bearing ring member is formed of titanium alloy; and
   the raceway surface formation member comprised of an iron-based material is cast in the titanium alloy and inserted into the main bearing ring member using pressing by shrink-fitting to unite the two members.

8. A bearing according to claim 1, wherein the bearing ring is an inner ring;
   the main bearing ring member is formed of aluminum alloy; and
   forging is used to unite the raceway surface formation member formed of iron-based material with the main bearing ring member.

* * * * *